US012689953B2

(12) United States Patent
Zhang

(10) Patent No.: US 12,689,953 B2
(45) Date of Patent: Jul. 21, 2026

(54) FLEXIBLE VOICE OVER WiFi (VoWiFi) HANDOVER TO CELLULAR

(71) Applicant: T-Mobile USA, Inc., Bellevue, WA (US)

(72) Inventor: Lin Zhang, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 224 days.

(21) Appl. No.: 17/407,938

(22) Filed: Aug. 20, 2021

(65) Prior Publication Data

US 2023/0054886 A1 Feb. 23, 2023

(51) Int. Cl.
*H04W 36/00* (2009.01)
*H04W 28/02* (2009.01)
(Continued)

(52) U.S. Cl.
CPC . *H04W 36/00837* (2018.08); *H04W 36/0058* (2018.08); *H04W 36/0079* (2018.08);
(Continued)

(58) Field of Classification Search
CPC ..... H04W 36/30; H04W 36/14; H04W 24/02; H04W 36/0083; H04W 36/0085; H04W 36/0022; H04W 36/08; H04W 16/18
See application file for complete search history.

(56) References Cited

U.S. PATENT DOCUMENTS

| | | | |
|---|---|---|---|
| 10,225,777 B2 | 3/2019 | Singh et al. | |
| 2007/0232302 A1* | 10/2007 | Aminov | ................ H04W 36/36 |
| | | | 455/433 |

(Continued)

FOREIGN PATENT DOCUMENTS

| | | | | |
|---|---|---|---|---|
| CN | 110933724 A | * | 3/2020 | ........ H04W 36/0066 |
| WO | 2016046698 A1 | | 3/2016 | |

(Continued)

OTHER PUBLICATIONS

International Search Report and Written Opinion, by the ISA/KR, mailed Nov. 15, 2022, regarding PCT Application No. PCT/US2022/074405 (7 pages).

*Primary Examiner* — Nam T Huynh
(74) *Attorney, Agent, or Firm* — Foley IP Law, PLLC

(57) ABSTRACT

A flexible solution for handling WiFi to cellular (W2C) handover (e.g., for voice over WiFi (VoWiFi) or video calls) includes: determining, for a wireless network, at least one live conversation performance indicator; based on the at least one live conversation performance indicator, determining at least one W2C handover parameter of a set of W2C handover parameters, the set of W2C handover parameters including a first W2C handover parameter indicating a first trigger condition and a second W2C handover parameter indicating a second trigger condition; and transmitting, by the wireless network, to a user equipment (UE), the at least one W2C handover parameter. In some examples, the W2C handover parameters include a reference signal receive power (RSRP) threshold and/or a received signal strength indication (RSSI) threshold. In some examples, live conversation performance indicators may include a cellular call drop rate, a WiFi call drop rate, and a handover failure rate.

18 Claims, 6 Drawing Sheets

(51) Int. Cl.
  H04W 36/14 (2009.01)
  H04W 36/30 (2009.01)
  H04W 36/36 (2009.01)

(52) U.S. Cl.
  CPC .... H04W 36/1446 (2023.05); *H04W 28/0268*
    (2013.01); *H04W 36/00226* (2023.05); *H04W*
      *36/302* (2023.05); *H04W 36/36* (2013.01)

(56) References Cited

U.S. PATENT DOCUMENTS

| | | | |
|---|---|---|---|
| 2015/0036663 A1 | 2/2015 | Kilpatrick et al. | |
| 2016/0316425 A1* | 10/2016 | Cili ...................... | H04W 24/08 |
| 2018/0184344 A1* | 6/2018 | Periyasamy .......... | H04W 36/32 |
| 2019/0274082 A1* | 9/2019 | Vemuri ................ | H04W 48/04 |
| 2021/0029767 A1 | 1/2021 | Teyeb et al. | |
| 2022/0248256 A1* | 8/2022 | Lee ................... | H04W 28/0268 |

FOREIGN PATENT DOCUMENTS

| | | | |
|---|---|---|---|
| WO | 2016200660 A1 | 12/2016 | |
| WO | WO-2022058013 A1 * | 3/2022 | |

* cited by examiner

Figure 4:
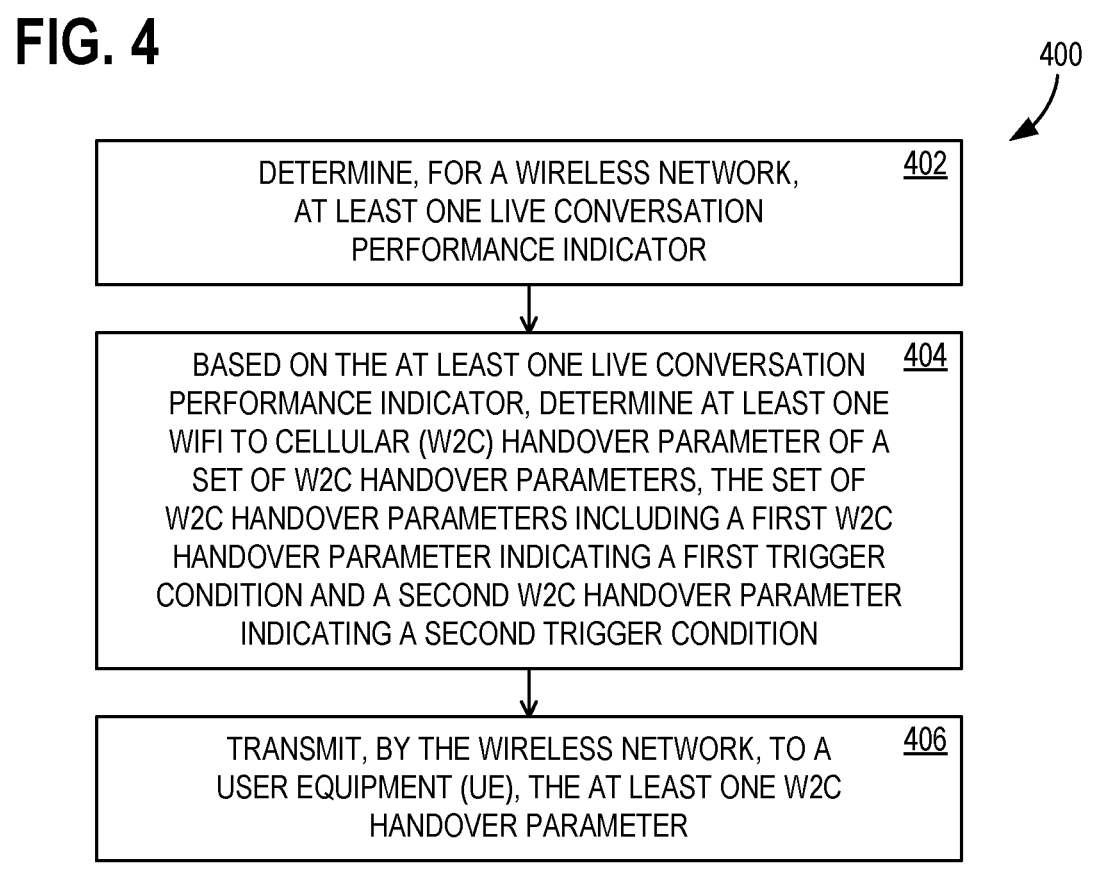

FIG. 4                                                                    400

DETERMINE, FOR A WIRELESS NETWORK,          402
AT LEAST ONE LIVE CONVERSATION
PERFORMANCE INDICATOR

BASED ON THE AT LEAST ONE LIVE CONVERSATION          404
PERFORMANCE INDICATOR, DETERMINE AT LEAST ONE
WIFI TO CELLULAR (W2C) HANDOVER PARAMETER OF A
SET OF W2C HANDOVER PARAMETERS, THE SET OF
W2C HANDOVER PARAMETERS INCLUDING A FIRST W2C
HANDOVER PARAMETER INDICATING A FIRST TRIGGER
CONDITION AND A SECOND W2C HANDOVER PARAMETER
INDICATING A SECOND TRIGGER CONDITION

TRANSMIT, BY THE WIRELESS NETWORK, TO A          406
USER EQUIPMENT (UE), THE AT LEAST ONE W2C
HANDOVER PARAMETER

Figure 5:
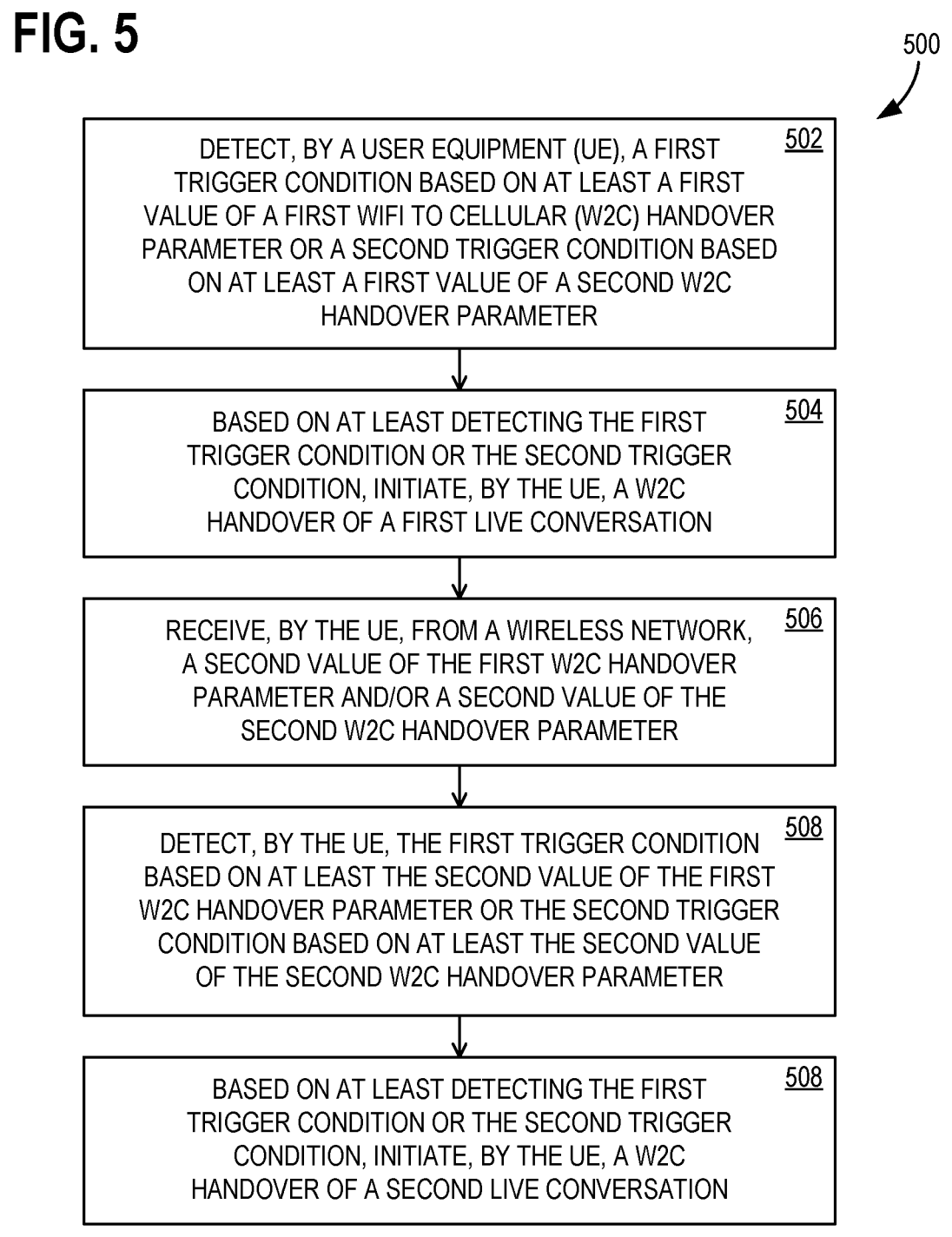

DETECT, BY A USER EQUIPMENT (UE), A FIRST
TRIGGER CONDITION BASED ON AT LEAST A FIRST
VALUE OF A FIRST WIFI TO CELLULAR (W2C) HANDOVER
PARAMETER OR A SECOND TRIGGER CONDITION BASED
ON AT LEAST A FIRST VALUE OF A SECOND W2C
HANDOVER PARAMETER    502

BASED ON AT LEAST DETECTING THE FIRST
TRIGGER CONDITION OR THE SECOND TRIGGER
CONDITION, INITIATE, BY THE UE, A W2C
HANDOVER OF A FIRST LIVE CONVERSATION    504

RECEIVE, BY THE UE, FROM A WIRELESS NETWORK,
A SECOND VALUE OF THE FIRST W2C HANDOVER
PARAMETER AND/OR A SECOND VALUE OF THE
SECOND W2C HANDOVER PARAMETER    506

DETECT, BY THE UE, THE FIRST TRIGGER CONDITION
BASED ON AT LEAST THE SECOND VALUE OF THE FIRST
W2C HANDOVER PARAMETER OR THE SECOND TRIGGER
CONDITION BASED ON AT LEAST THE SECOND VALUE
OF THE SECOND W2C HANDOVER PARAMETER    508

BASED ON AT LEAST DETECTING THE FIRST
TRIGGER CONDITION OR THE SECOND TRIGGER
CONDITION, INITIATE, BY THE UE, A W2C
HANDOVER OF A SECOND LIVE CONVERSATION    508

FLEXIBLE VOICE OVER WiFi (VoWiFi) HANDOVER TO CELLULAR

BACKGROUND

Some cellular telephones, known as user equipment (UE), are also able to place voice calls over WiFi and so may do so when cellular service is unavailable or is performing poorly. When cellular service does become available and is performing properly, it may be preferable to shift the call over to cellular (e.g., perform a handover to cellular) because cellular networks generally provide a superior guaranteed quality of service (QoS) than WiFi.

When a cellular network is performing well (e.g., has a low cellular call drop rate), WiFi is performing poorly (e.g., has a high WiFi call drop rate), and handover failure rates are low (e.g., below 0.2%), failing to initiate a handover to cellular deprives a user of a potentially superior call experience. However, when a cellular network is performing poorly (e.g., has a high cellular call drop rate), WiFi is performing well (e.g., has a low WiFi call drop rate), and handover failure rates are high (e.g., above 1%), initiating a handover to cellular potentially exposes a user to an inferior call experience. A complicating factor is that both WiFi and cellular network conditions may change over time.

SUMMARY

The following summary is provided to illustrate examples disclosed herein but is not meant to limit all examples to any particular configuration or sequence of operations.

A flexible solution for handling WiFi to cellular (W2C) handover (e.g., for voice over WiFi (VoWiFi) or video calls) includes: determining, for a wireless network, at least one live conversation performance indicator; based on the at least one live conversation performance indicator, determining at least one W2C handover parameter of a set of W2C handover parameters, the set of W2C handover parameters including a first W2C handover parameter indicating a first trigger condition and a second W2C handover parameter indicating a second trigger condition; and transmitting, by the wireless network, to a user equipment (UE), the at least one W2C handover parameter—without requiring a software update for the UE. In some examples, the W2C handover parameters include a reference signal receive power (RSRP) threshold and/or a received signal strength indication (RSSI) threshold. In some examples, live conversation performance indicators may include a cellular call drop rate, a WiFi call drop rate, and a handover failure rate.

Another flexible solution for handling W2C handover (e.g., for VoWiFi or video calls) includes: detecting, by a UE, a first trigger condition based on at least a first value of a first W2C handover parameter or a second trigger condition based on at least a first value of a second W2C handover parameter; based on at least detecting the first trigger condition or the second trigger condition, initiating, by the UE, a W2C handover of a first live conversation; receiving, by the UE, from a wireless network, a second value of the first W2C handover parameter and/or a second value of the second W2C handover parameter; detecting, by the UE, the first trigger condition based on at least the second value of the first W2C handover parameter or the second trigger condition based on at least the second value of the second W2C handover parameter; and based on at least detecting the first trigger condition or the second trigger condition, initiating, by the UE, a W2C handover of a second live conversation. This occurs without requiring a software update for the UE, in order for the UE to use the second values of the first or second W2C handover parameter.

BRIEF DESCRIPTION OF THE DRAWINGS

The disclosed examples are described below with reference to the accompanying drawing figures listed below, wherein:

FIG. 4 illustrates another flowchart of exemplary operations associated with flexible VoWiFi handover to cellular in the arrangement of FIG. 1;

FIG. 5 illustrates another flowchart of exemplary operations associated with flexible VoWiFi handover to cellular in the arrangement of FIG. 1.

Figure 1:
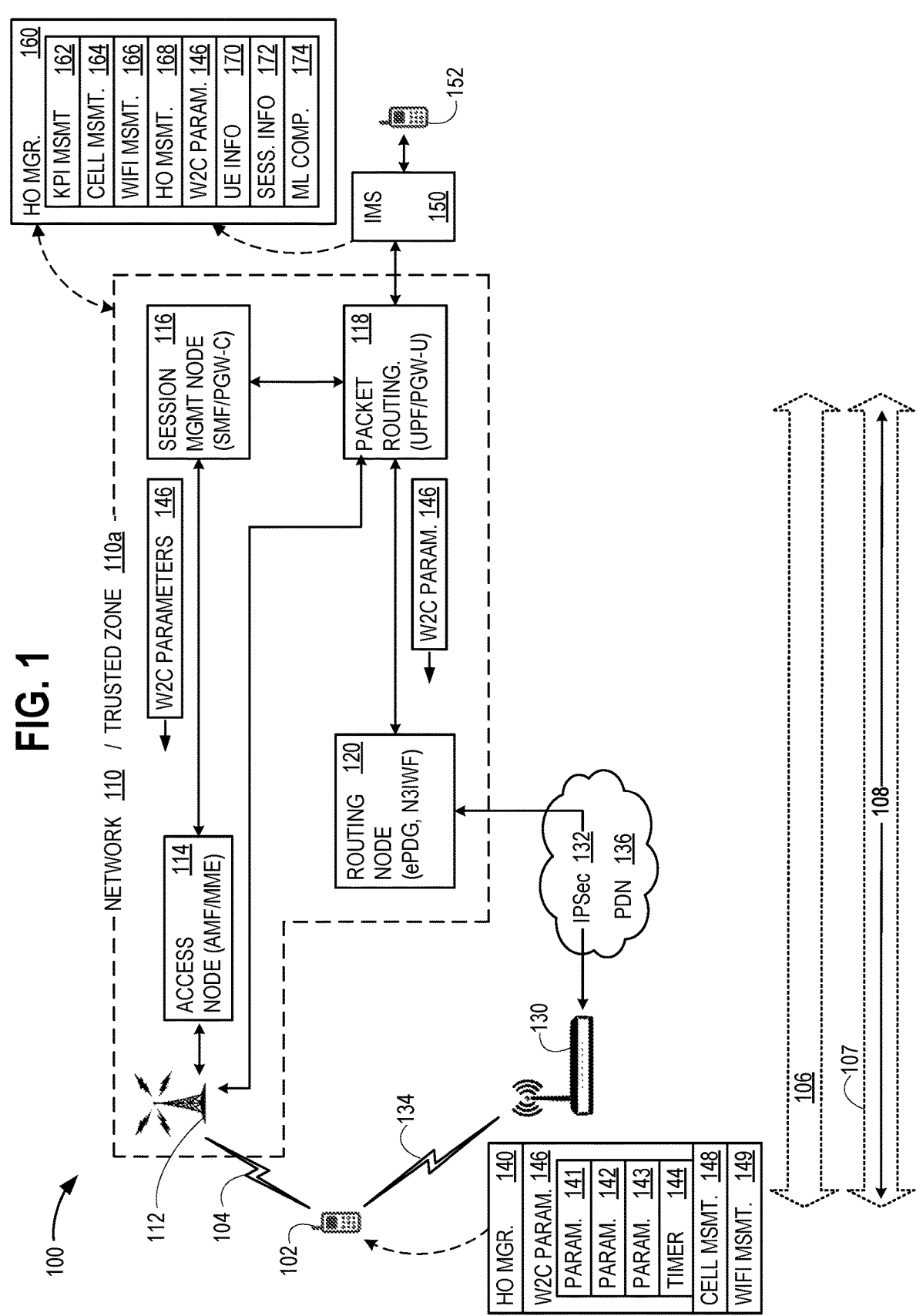
FIG. 1 illustrates an exemplary arrangement that advantageously employs flexible voice over WiFi (VoWiFi) and video calls over WiFi handover to cellular.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Because both WiFi and cellular network conditions may change over time, a scheme for handling voice over WiFi (VoWiFi) handover to cellular that is sufficiently flexible to adapt to changing network conditions provides a way to balance the aggressiveness of initiating WiFi to cellular (W2C) handover for voice over WiFi (VoWiFi) or video calls. This improves overall network performance (e.g., reliability by reducing the number of dropped calls), thereby improving user experiences.

A flexible solution for handling W2C handover includes: determining, for a wireless network, at least one live conversation performance indicator; based on the at least one live conversation performance indicator, determining at least one W2C handover parameter of a set of W2C handover parameters, the set of W2C handover parameters including a first W2C handover parameter indicating a first trigger condition and a second W2C handover parameter indicating a second trigger condition; and transmitting, by the wireless network, to a user equipment (UE), the at least one W2C handover parameter—without requiring a software update for the UE. In some examples, the W2C handover parameters include a reference signal receive power (RSRP) threshold and/or a received signal strength indication (RSSI) threshold. In some examples, live conversation performance indicators may include a cellular call drop rate, a WiFi call drop rate, handover call drop rate, and/or handover failure rate.

Another flexible solution for handling W2C handover includes: detecting, by a UE, a first trigger condition based on at least a first value of a first W2C handover parameter or a second trigger condition based on at least a first value of a second W2C handover parameter; based on at least detecting the first trigger condition or the second trigger condition, initiating, by the UE, a W2C handover of a first live conversation; receiving, by the UE, from a wireless network, a second value of the first W2C handover parameter and/or a second value of the second W2C handover parameter; detecting, by the UE, the first trigger condition based on at least the second value of the first W2C handover parameter or the second trigger condition based on at least the second value of the second W2C handover parameter; and based on at least detecting the first trigger condition or the second trigger condition, initiating, by the UE, a W2C handover of a second live conversation.

The W2C handover parameters may be tuned, as disclosed herein, to provide improved wireless network performance and user experience without requiring a software update of the UE. In some examples, this permits use of the new W2C handover parameters without service interruption (e.g., a power-cycle, a device reboot, a network de-registration/re-registration event, or other interruption).

Aspects of the disclosure improve the reliability of wireless communication by determining at least one set of W2C handover parameters based on at least a live conversation performance indicator (e.g., a cellular call drop rate, a WiFi call drop rate, and/or a handover call drop rate/handover failure rate) and performing a W2C handover in accordance with the set of W2C handover parameters. Aspects additionally improve user experience because the set of W2C handover parameters may be tailored to specific user call scenarios, such as a cellular technology generation, a model of the UE, and whether a dedicated bearer (or quality of service (QoS) flow) is already in use for a live conversation session (e.g., in-call) or not yet in use (e.g., no-call).

In some examples, eight W2C handover parameters may be used for a given UE model using a particular cellular technology generation, such as fifth generation (5G) cellular technology or fourth generation (4G) cellular technology. For example, the W2C handover parameter set may include: (1) an aggressive in-call W2C handover threshold based on an RSRP of a cellular signal, (2) a conservative in-call W2C handover threshold based on an RSRP of a cellular signal, (3) another conservative in-call W2C handover threshold based on an RSSI of a WiFi signal, (4) an in-call handover timer value to prevent ping-pong handovers when signal levels fluctuate rapidly, (5) an aggressive no-call W2C handover threshold based on an RSRP of a cellular signal, (6) a conservative no-call W2C handover threshold based on an RSRP of a cellular signal, (7) another conservative no-call W2C handover threshold based on an RSSI of a WiFi signal, and (8) a no-call handover timer value to prevent ping-pong handovers when signal levels fluctuate rapidly. In some examples, a single handover timer value may be used for both in-call and no-call. This set of eight W2C handover parameters may be doubled for a particular UE, with eight for 5G and another eight equivalent parameters for 4G. For some examples, parameter (1), (2), (5), (6) may be RSRQ instead of RSRP.

The terms in-call and no-call refer to whether a dedicated bearer (or QoS flow) is set up for a live conversation session (e.g., a voice or video call). When a cellular device, such as a UE, connects to a cellular network, two data pipes are typically set up. One is a data default bearer (or QoS flow), and one is an internet protocol (IP) multimedia system (IMS) default bearer. The IMS default bearer (or QoS flow) is used for session initiation protocol (SIP) signaling, which is used for setting up calls. When only the default bearer (or QoS flow) has been set up, but the dedicated bearer (or QoS flow) has not yet been set up for a call, this is the no-call scenario. When a UE attempts to place a voice call, such as a voice over long-term evolution (VoLTE) call in 4G, a voice over new radio (VoNR) call in 5G, or a VoWiFi call, SIP signaling over the IMS default bearer (or QoS flow) in the wireless network control plane is used to set up an IMS dedicated bearer (or QoS flow) for a call data pipe. When a dedicated bearer (or QoS flow) has been set up, this is the in-call scenario.

RSRP is the average power of resource elements (RE) that carry cell specific Reference Signals (RSs) over the allocated bandwidth. RSSI is an estimated measure of power level that a device is receiving from a transmitter. In some examples, RSRP thresholds may be exchanged for RSSI thresholds and the reverse. This is because RSRP and RSSI have a defined mathematical relationship, which includes the number of physical resource blocks (PRBs) used. Reference signal received quality (RSRQ) indicates the quality of the received reference signal and may be determined based on the number of used resource blocks used. RSRQ provides additional information when RSRP is not sufficient to make a reliable handover or cell reselection decision. In some examples, RSRQ may be determined as $RSRQ = (N*RSRP)/RSSI$ measured over the bandwidth used, where N is the number of used resource blocks.

For a UE with a cellular preferred mode, the disclosed solution provides a flexible handover framework to be able to tune the aggressive level of W2C handover for IMS voice and video calls, based on the handover quality (e.g., handover failure rate, handover call drop rate) and/or other relevant performance factors. This permits optimizing voice and video call key performance indicators (KPIs), such as call drop rate and call muting, by fine-tuning when handovers occur (e.g., by tuning the thresholds). Flexibility is provided to customize aggressive, conservative, and hybrid handovers, set different thresholds for 5G and 4G, set different thresholds for in-call and no-call scenarios, and set different thresholds for different UE models. In some examples, machine learning (ML), which includes artificial intelligence (AI) here, provides the determination of the W2C handover thresholds with closed-loop feedback that can be used for ongoing training to further improve performance.

With reference now to the figures, FIG. 1 illustrates an arrangement 100 that advantageously employs flexible W2C handovers for voice and/or video calls. Arrangement 100 includes a wireless network 110 that supports cellular calls, such as VoNR using 5G and VoLTE using 4G, in addition to managed VoWiFi calls through a routing node 120. In some examples, routing node 120 comprises a non-3GPP interworking function (N3IWF). In some examples, routing node 120 comprises an evolved packet data gateway (ePDG). In FIG. 1 UE 102 is attempting to initiate a live conversation session 108 (e.g., a voice call or a video call) to another UE 152, through an IMS network 150. When UE 102 registers with wireless network 110, a default bearer (or QoS flow) 106 is set up, and when UE 102 initiates live conversation session 108, a dedicated bearer 107 (or QoS flow) is set up as a data pipe to carry the packets. In some examples, the function of dedicated bearer 107 is performed by a QoS flow.

A cellular voice call (e.g., VoNR, VoLTE, or another type) will pass from UE 102 over an air interface 104 to a radio access network (RAN) 112 in wireless network 110, through a packet routing node 118 (also within wireless network 110), and then to IMS network 150 in order to reach UE 152. Signaling for a cellular call passes from RAN 112 to an access node 114 and a session management node 116. For 5G, access node 114 may comprise an access and mobility function (AMF), session management node 116 may comprise a session management function, and packet routing node 118 may comprise a user plane function (UPF). For 4G, access node 114 may comprise a mobility management entity (MME), session management node 116 may comprise a packet data network gateway (PGW)—control plane (PGW-C), and packet routing node 118 may comprise a PGW—user plane (PGW-U). UE 102 authenticates itself to RAN 112. Because RAN 112, access node 114, session management node 116, and packet routing node 118 are all under the control of the cellular carrier that operates wireless network 110, they are within a trusted network zone 110a.

A managed VoWiFi call will pass from UE 102 over an air interface 134 to a WiFi router 130, through a packet data network (PDN) 136 using an IP security (IPSec) tunnel 132 to routing node 120 within wireless network 110. PDN 136 may be the internet, and may be an example of a network 660, which is described in further detail in relation to FIG. 6. From routing node 120, a VoWiFi call will then pass-through packet routing node 118 to IMS 150 in order to reach UE 152. Because routing node 120 is within wireless network 110 and managed by the cellular carrier, routing node 120 is also within a trusted network zone 110a. However, WiFi router 130 may not be managed by the cellular carrier or be within wireless network 110. Therefore, UE 102 may be attempting to access resources within wireless network 110 from an untrusted zone (e.g., air interface 134).

An internet key exchange (IKE) protocol may be used for setting up a trusted connection, so that wireless network 110 accepts traffic from PDN 136. For example, UE 102 may attempt to initiate live conversation session 108 using an IKE_SA_INIT message (or IKEv2_SA_INIT message), which initiates a security association (SA) in IPSec protocol and sets up a secure channel (e.g., IPSec tunnel 132).

UE 102 has a UE handover manager 140 that manages W2C handover activity for UE 102 in accordance with set of W2C handover parameters 146. UE handover manager 140 also manages handovers in the opposite direction, cellular to WiFi (C2W). To assist in determining handover trigger conditions, UE handover manager 140 employs a cellular signal measurement component 148 that performs RSRP, and/or RSRQ, and/or RSSI measurements of a cellular signal received from RAN 112 (e.g., the downlink side of air interface 104). UE handover manager 140 also employs a WiFi signal measurement component 149 that performs RSSI measurements of a WiFi signal received from WiFi router 130 (e.g., the downlink side of air interface 134).

Set of W2C handover parameters 146 is illustrated as having four W2C handover parameters, W2C handover parameter 141, W2C handover parameter 142, W2C handover parameter 143, and handover timer value 144, although it should be understood that a different count of W2C handover parameters may be used. For example, a list of eight example W2C handover parameters for each of 5G and 4G (indicating 16 different W2C handover parameters) was provided above. The set of three W2C handover parameters 141-142, plus handover timer value 144, indicated in FIG. 1 may be specific either in-call or no-call scenarios, and 5G or 4G. However, the alternative scenarios may follow a similar scheme.

For this example, W2C handover parameter 141 is used as an aggressive hand-in cellular RSRP threshold, W2C handover parameter 142 is used as a conservative hand-in cellular RSRP threshold, W2C handover parameter 143 is used as a WiFi RSSI threshold, and handover timer value 144 is used to prevent ping-pong handover situations when RSRP and RSSI levels (as measured by cellular signal measurement component 148 and WiFi signal measurement component 149) rapidly fluctuate.

At least three scenarios are contemplated: use of W2C handover parameter 141 for an aggressive W2C handover trigger, use of W2C handover parameter 142 and W2C handover parameter 143 for a conservative W2C handover trigger, and use of all three W2C handover parameters 141-143 for a hybrid W2C handover trigger. An aggressive W2C handover attempts to move a call to cellular whenever the cellular signal is sufficiently strong, independently of the strength of the WiFi signal. A conservative W2C handover attempts to move a call to cellular whenever the cellular signal is sufficiently strong and the WiFi signal is weak (e.g., below the RSSI threshold identified in W2C handover parameter 143). A hybrid W2C handover attempts to move a call to cellular in one of two situations: Either the cellular signal is sufficiently strong, and the WiFi signal is weak (using the conservative W2C handover trigger condition) or the cellular signal is exceptionally strong (using the aggressive W2C handover trigger condition with the threshold set relatively high, but not unattainable).

For in-call scenarios, in some examples, W2C handover parameter 141 may be set to a value of −115 decibels-milliwatt (dBm) when aggressive W2C handover is desired, −100 dBm when a hybrid W2C handover aggressiveness is preferred, or to −20 dBm (an effectively unattainable level) to disable aggressive W2C (e.g., only conservative W2C handover is desired). In some examples, W2C handover parameter 142 may be set to a value of −115 decibels-milliwatt (dBm) when conservative or hybrid W2C handover aggressiveness is preferred, or to −20 dBm (an effectively unattainable level) to disable the conservative W2C handover trigger (e.g., only aggressive W2C handover is desired). W2C handover parameter 143 may be set to a value ranging from −70 dBm to −80 dBm and may be used in conjunction with W2C handover parameter 142 for the conservative and hybrid W2C handover triggers. The above values are just examples for the W2C handover parameters, and may be set to different values, based on further experience with KPI and user satisfaction.

Aggressive W2C handover, which increases the likelihood of W2C handovers (e.g., there will be more) may be preferred when the handover failure rate is below 0.2%. However, conservative W2C handover, which does not result in as many W2C handover events as does aggressive W2C handover, may be preferred when the handover failure rate is above 1%. In such scenarios, W2C handover parameter 141 may be set to a value of −20 dBm to disable aggressive W2C. Whereas an aggressive W2C handover trigger may involve a comparison of only a cellular RSRP measurement with a threshold (e.g., W2C handover parameter 141), a conservative W2C trigger may both compare a cellular RSRP measurement with a threshold (e.g., W2C handover parameter 142) and also compare a WiFi RSSI measurement with a threshold (e.g., W2C handover parameter 143).

Hybrid W2C handover, which is between the aggressiveness of aggressive and conservative handover, may be preferred when the handover failure rate is below 0.2% only when RSRP is above −100 dBm (handover failure rate is above 0.2% when RSRP is lower than −100 dBm), in this scenario, W2C handover parameter 141 may be set to a value of −100 dBm to encourage the aggressive W2C handover when RSRP is above −100 dBm, at the same time the W2C handover parameter 142 may be set to a value of −115 dBm to enable the conservative W2C handover only when WiFi signal is weak. The above handover failure rates and handover parameters are just examples, and may be set to different values, based on further experience with KPI and user satisfaction.

For no-call scenarios, a different set of thresholds may be used with same basic scheme. However, since only default bearer (or QoS flow) 106 is set up for no-call scenarios, and a user is not yet conducting a call (e.g., dedicated bearer 107 is not yet set up and live conversation session 108 does not yet exist), a user will not experience a call drop if a handover fails. Thus, no-call W2C handovers may be more aggressive without negatively impacting user experience. No-call W2C parameters may therefore be set lower for cellular signal measurements and higher for WiFi signal measurements. This encourages a higher number of calls to start on cellular, thereby achieving a generally superior QoS for callers.

A network handover manager 160 determines (generates) set of W2C handover parameters 146 for UE 102 and may also generate a set of C2W handover parameters for a similar flexible C2W handover scheme. To assist in determining set of W2C handover parameters 146, network handover manager 160 employs a KPI measurement component 162 that performs measurements of live conversation performance indicators for wireless network 110, including a cellular call drop rate (measured by a cellular KPI measurement component 164), a WiFi call drop rate (measured by a WiFi KPI measurement component 166), and a handover failure rate or handover call drop rate (measured by a handover KPI measurement component 168). Other KPIs (live conversation performance indicators) may also be measured. Network handover manager 160 may be a $3^{rd}$ party entity connected to wireless network 110 and/or IMS network (150), or located within session management node 116, or elsewhere within wireless network 110. Network handover manager 160 may transmit set of W2C handover parameters 146 over the control plane or user plane of the cellular portion of wireless network 110, and/or through routing node 120 and WiFi.

Network handover manager 160 uses UE information 170, providing information such as a manufacturer, software version, and/or model of UE 102, in order to customize set of W2C handover parameters 146 for UE 102. For example, Android UEs and iOS UEs, or even different manufacturers' versions of Android UEs or different versions of iOS UEs, may receive different W2C handover parameters. In some examples, network handover manager 160 uses session information 172, providing information such as whether UE is connected with 5G or with 4G, or other connection information, in order to customize set of W2C handover parameters 146 for UE 102—although, in some examples, network handover manager 160 sends set of W2C handover parameters 146 with each 5G and 4G values, and UE handover manager 140 decides which set of values to use, based on connectivity.

Network handover manager 160 may determine set of W2C handover parameters 146 on some set schedule, and/or after significant network maintenance, repair or change events (e.g., adding, removing, or relocating RAN 112, software update of any node in wireless network 110 or IMS network 150). Example schedules may be hourly, daily, weekly, or monthly. In some examples an ML component 174 uses machine learning (or AI) to determine set of W2C handover parameters 146. ML component 174 may then monitor call drops and handover drops in order to determine whether W2C handover parameters 146 had been optimized for the conditions that had been measured. Results may be used for ongoing training of ML component 174 so that ML component 174 improves its ability to generate set of W2C handover parameters 146 that improve user experience.

Figure 2:
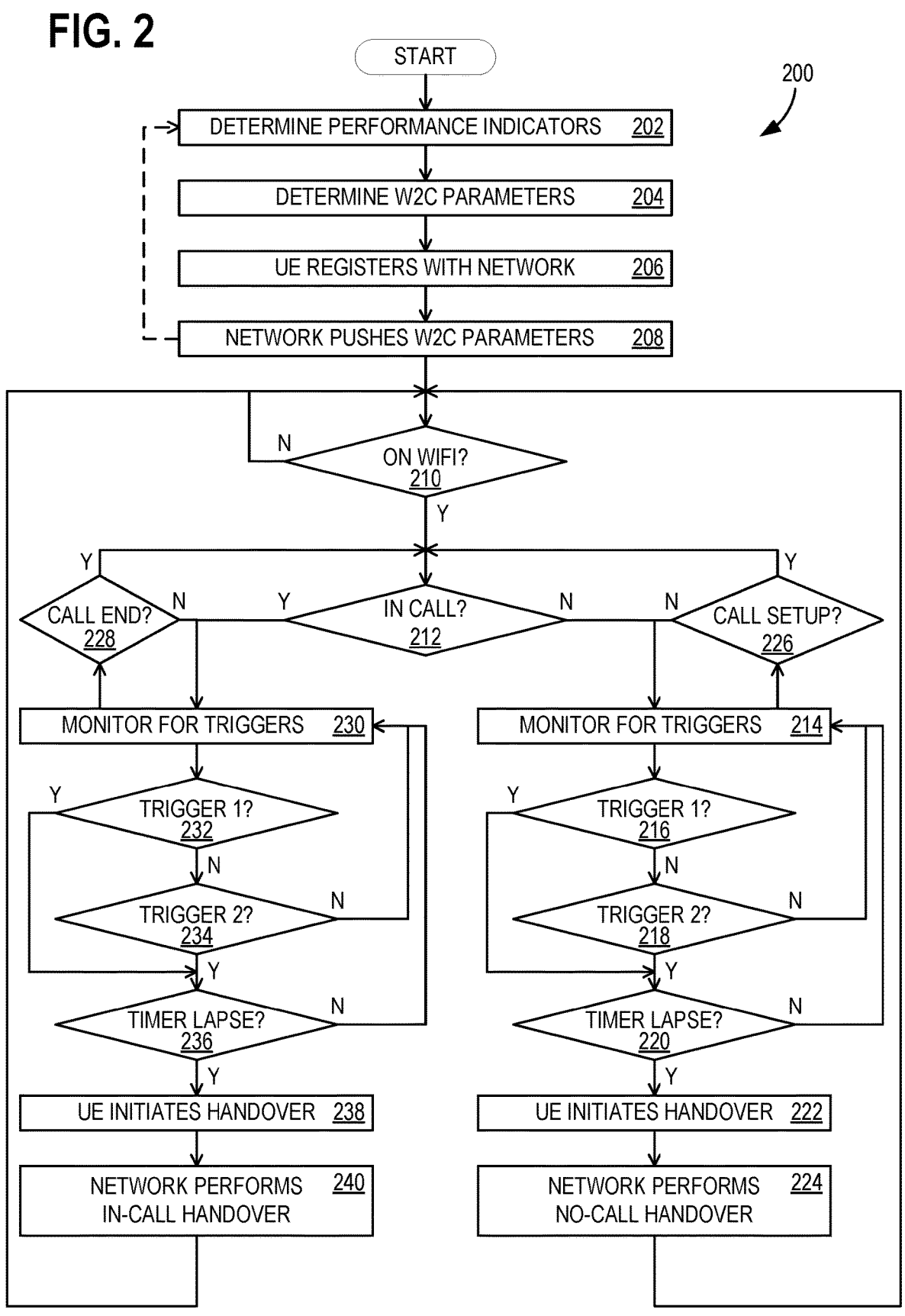
FIG. 2 illustrates a flowchart of exemplary operations associated with flexible VoWiFi handover to cellular in the arrangement of FIG. 1.
Figure 3:
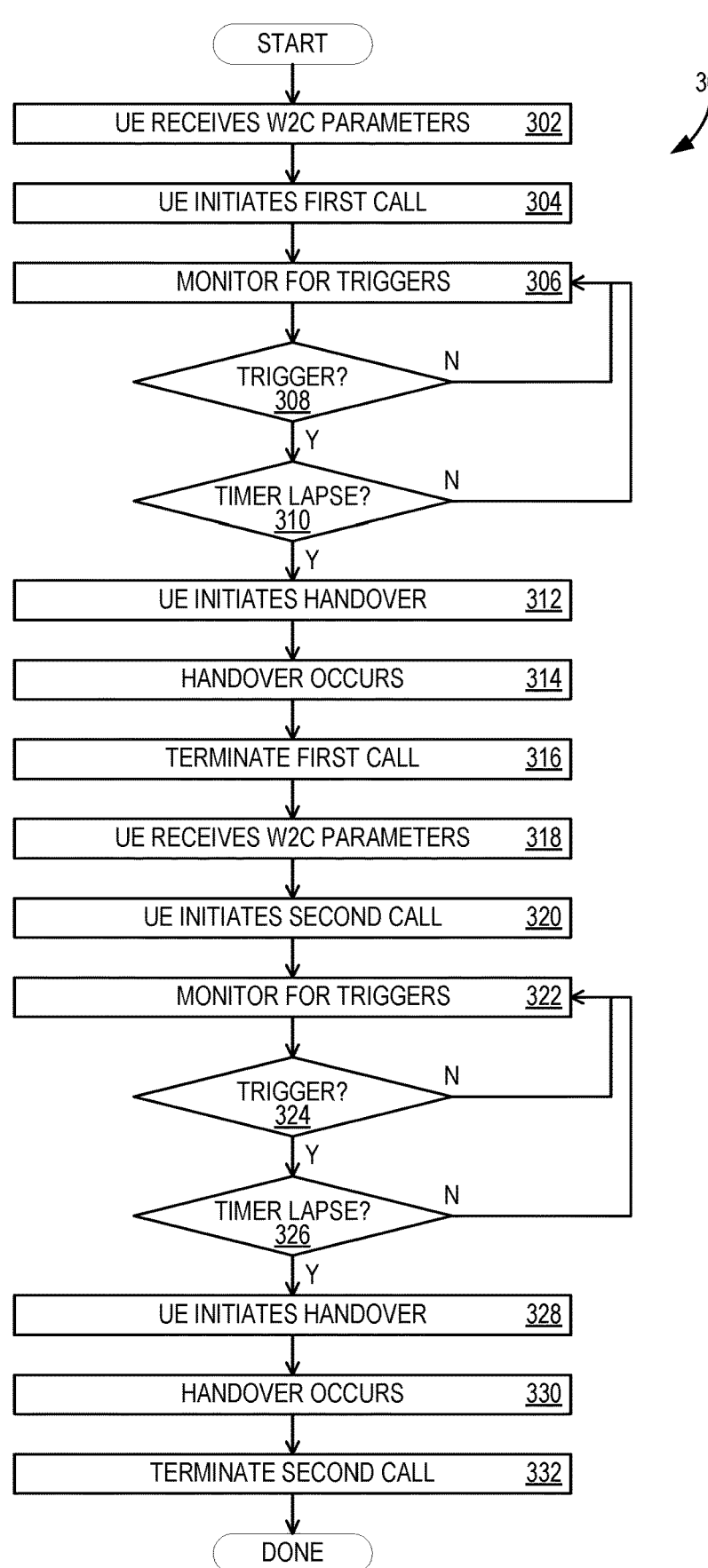
FIG. 3 illustrates another flowchart of exemplary operations associated with flexible VoWiFi handover to cellular in the arrangement of FIG. 1.

The operations of arrangement 100 are described in further detail in relation to the flowcharts of FIGS. 2 and 3. FIG. 2 illustrates a flowchart 200 of exemplary operations associated with flexible VoWiFi handover to cellular in arrangement 100. In some examples, at least a portion of flowchart 200 may be performed using one or more computing devices 600 of FIG. 6. Flowchart 200 commences with operation 202, which includes determining, for wireless network 110, at least one live conversation performance indicator. In some examples, determining at least one live conversation performance indicator comprises both determining at least one live conversation performance indicator for a live conversation session over cellular and determining at least one live conversation performance indicator for a live conversation session over WiFi. In some examples, the at least one live conversation performance indicator is selected from the list consisting of: a cellular call drop rate, a WiFi call drop rate, handover call drop rate, and a handover failure rate.

Operation 204 includes, based on the at least one live conversation performance indicator, determining at least one W2C handover parameter (e.g., any of W2C handover parameter 141-143 or handover timer value 144) of set of W2C handover parameters 146, set of W2C handover parameters 146 including a first W2C handover parameter indicating a first trigger condition and a second W2C handover parameter indicating a second trigger condition. In some examples, determining at least one W2C handover parameter comprises both determining the first W2C handover parameter and determining the second W2C handover parameter (e.g., determining two parameters).

In some examples, set of W2C handover parameters 146 includes at least one threshold for a cellular signal. In some examples, set of W2C handover parameters 146 includes at least one RSRP threshold. In some examples, set of W2C handover parameters 146 includes at least two thresholds for a cellular signal. In some examples, set of W2C handover parameters 146 includes at least two RSRP thresholds. In some examples, set of W2C handover parameters 146 includes at least a threshold for a WiFi signal. In some examples, set of W2C handover parameters 146 includes at least one RSSI threshold. In some examples, set of W2C handover parameters 146 is specific to 5G cellular technology. In some examples, set of W2C handover parameters 146 is specific to 4G cellular technology. In some examples, set of W2C handover parameters 146 includes a handover timer value.

In some examples, set of W2C handover parameters 146 is specific to at least one factor selected from the list consisting of: a cellular technology generation, a model of UE 102, and whether a dedicated bearer (or QoS flow) is already in use for a live conversation session (e.g., in-call versus no-call). In some examples, determining at least one W2C handover parameter comprises determining at least one W2C handover parameter with ML component 174. In some examples, set of W2C handover parameters 146 includes at least two in-call thresholds for a cellular signal and an in-call threshold for a WiFi signal. In some examples, set of W2C handover parameters 146 includes at least two in-call thresholds for a cellular signal, an in-call threshold for a WiFi signal, at least two no-call thresholds for a cellular signal, and a no-call threshold for a WiFi signal. In some examples, the thresholds for a cellular signal comprise RSRP thresholds and the threshold for a WiFi signal comprises an RSSI threshold.

UE 102 registers with wireless network 110 in operation 206, which includes setting up default bearer (or QoS flow) 106 for UE 102. Operation 208 includes transmitting, by wireless network 110, to UE 102, the at least one W2C handover parameter. UE 102 receives a value of the first W2C handover parameter (and any other W2C handover parameters that are transmitted) from wireless network 110. In some examples, transmitting the at least one W2C handover parameter comprises both transmitting a first W2C handover parameter and transmitting a second W2C handover parameter (e.g., transmitting two parameters). In some examples, transmitting the at least one W2C handover parameter comprises transmitting the at least one W2C handover parameter without transmitting a UE software update. In some examples, transmitting multiple values of the at least one W2C handover parameter in multiple events, between UE software updates. Flowchart 200 then loops back to operation 202 on a refresh schedule for set of W2C handover parameters 146 in parallel with proceeding on to decision operation 210.

Decision operation 210 determines whether UE 102 is set for a managed WiFi call through PDN 136. If so, flowchart 200 proceeds to decision operation 212, which determines whether UE 102 has already initiated a call over WiFi. If so, flowchart 200 proceeds to operation 230, described below. Otherwise, UE 102 will proceed to operation 214 using no-call W2C handover parameters. In operation 214, UE 102 monitors for a first no-call trigger condition and a second no-call trigger condition. The first no-call trigger condition may be an aggressive W2C handover trigger condition (e.g., using W2C handover parameter 141), and the second no-call trigger condition may be a conservative W2C handover trigger condition (e.g., using W2C handover parameter 142 and W2C handover parameter 143). One or both may be monitored. In parallel, flowchart 200 monitors for a call setup in decision operation 226. If a call setup is detected, next time flowchart 200 revisits decision operation 212, the other branch (operations 228-240 will be taken).

Decision operation 216 includes detecting, by UE 102, the first no-call trigger condition. If detected, flowchart 200 proceeds to decision operation 220, described below. Decision operation 216 may be bypassed if aggressive W2C handover is disabled, or the threshold may be set so high (e.g., −20 dBm) so that decision operation 216 reliably returns a No condition. Decision operation 218 includes detecting, by UE 102, the second no-call trigger condition. If detected, flowchart 200 proceeds to decision operation 220, described below. Decision operation 218 may be bypassed if only aggressive W2C handover is to be enabled, or the threshold may be set so high (e.g., −20 dBm) so that decision operation 218 reliably returns a No condition. If no trigger conditions are detected, flowchart 200 returns to operation 214.

Decision operation 220 determines whether handover timer value 144 has been exceeded (e.g., the handover timer has lapsed). If not, flowchart 200 returns to operation 214. Otherwise, operation 222 includes, based on at least detecting the first (no-call) trigger condition or the second (no-call) trigger condition, initiating, by UE 102, a no-call W2C handover, and operation 224 includes performing, by wireless network 110, a no-call W2C handover in accordance with set of W2C handover parameters 146. UE 102 is now on cellular service, but may return to WiFi based on C2W handover parameters (e.g., the cellular RSRP falls below a no-call cellular hand-out threshold, and/or the WiFi RSSI meets or exceeds a no-call WiFi hand-in threshold).

Returning to decision operation 212, if UE 102 had initiated a call (see, dedicated bearer 107 is in place for live conversation session 108. In some examples, live conversation session 108 comprises a voice call or a video call. In some examples, the voice call initially comprises a VoWiFi call. In some examples, the video call initially comprises a video call over WiFi. Otherwise, while the call remains ongoing, in operation 230, UE 102 monitors for a first in-call trigger condition and a second in-call trigger condition. The first in-call trigger condition may be an aggressive W2C handover trigger condition (e.g., using W2C handover parameter 141), and the second in-call trigger condition may be a conservative W2C handover trigger condition (e.g., using W2C handover parameter 142 and W2C handover parameter 143). One or both may be monitored. In parallel, flowchart 200 monitors for a call end (termination) in decision operation 228. If a call termination is detected, next time flowchart 200 revisits decision operation 212, the other branch (operations 214-226 will be taken).

Decision operation 232 includes detecting, by UE 102, the first in-call trigger condition. If detected, flowchart 200 proceeds to decision operation 236, described below. Decision operation 232 may be bypassed if aggressive W2C handover is disabled, or the threshold may be set so high (e.g., −20 dBm) so that decision operation 232 reliably returns a No condition. Decision operation 234 includes detecting, by UE 102, the second in-call trigger condition. If detected, flowchart 200 proceeds to decision operation 236, described below. Decision operation 234 may be bypassed if only aggressive W2C handover is to be enabled, or the threshold may be set so high (e.g., −20 dBm) so that decision operation 234 reliably returns a No condition. If no trigger conditions are detected, flowchart 200 returns to operation 230.

Decision operation 236 determines whether handover timer value 144 has been exceeded (e.g., the handover timer has lapsed). If not, flowchart 200 returns to operation 230. Otherwise, operation 238 includes, based on at least detecting the first (in-call) trigger condition or the second (in-call) trigger condition, initiating, by UE 102, an in-call W2C handover of live conversation session 108, and operation 240 includes performing, by wireless network 110, an in-call W2C handover in accordance with set of W2C handover parameters 146. UE 102 is now on cellular service, but may return to WiFi based on C2W handover parameters (e.g., the cellular RSRP falls below an in-call cellular hand-out threshold, and/or the WiFi RSSI meets or exceeds an in-call WiFi hand-in threshold). Flowchart 200 returns to operation 230 while the call remains ongoing. That is, as long as the dedicated bearer (or QoS flow) of a voice or video call remains live, UE 102 will continue to perform measurement and trigger W2C or C2W handovers when the trigger conditions occur. If there is only a default bearer (or QoS flow) but no dedicated bearer (or QoS flow), flowchart 200 returns to operation 212, which continues to perform measurement and trigger handover for no-call scenario.

FIG. 3 illustrates a flowchart 300 of exemplary operations associated with examples of arrangement 100. In some examples, at least a portion of flowchart 300 may be performed using one or more computing devices 600 of FIG. 6. Flowchart 300 provides a UE-based perspective of arrangement 100, and several operations in flowchart 300 correspond to operations in flowchart 200. Flowchart 300 commences with operation 302, which includes receiving, by UE 102, from wireless network 110, a first value of a first W2C handover parameter and/or a first value of a second W2C handover parameter (e.g., any two of W2C handover parameter 141-143 or handover timer value 144).

UE 102 initiates a first live conversation session (e.g., a first iteration of live conversation session 108) in operation 304, and monitors for the first trigger condition and the second trigger condition in operation 306. Decision operation 308 (a combination of decision operations 232 and 234 of flowchart 200) includes, detecting, by UE 102, the first trigger condition based on at least the first value of the first W2C handover parameter or the second trigger condition based on at least the first value of the second W2C handover parameter. If no trigger conditions are met, flowchart 300 returns to monitoring in operation 306.

Flowchart 300 waits until a time period determined by handover timer value 144 before initiating the first W2C handover. If decision operation 310 determines that the handover timer has not lapsed, flowchart 300 returns to monitoring in operation 306. Otherwise, if a trigger condition has been met, and the handover timer has lapsed, operation 312 includes, based on at least detecting the first trigger condition or the second trigger condition, initiating, by UE 102, a first W2C handover of the first live conversation. The handover occurs in operation 314, and the first live conversation terminates in operation 316.

Operation 318 includes receiving, by UE 102, from wireless network 110, a second value of the first W2C handover parameter and/or a second value of the second W2C handover parameter. UE 102 initiates a second live conversation session (e.g., a second iteration of live conversation session 108) in operation 320, and monitors for the first trigger condition and the second trigger condition (using the second value) in operation 322. Operations 302-322 may occur without requiring a software update for UE 102, because set of W2C handover parameters 146 are not hard-coded into the software as fixed values. In some examples, new parameters that are received during an ongoing call and may be applied to the current call or first applied to the subsequent call. That is, operation 318 may occur during the first live conversation session.

Decision operation 324 (a combination of decision operations 232 and 234 of flowchart 200) includes detecting, by UE 102, the first trigger condition based on at least the second value of the first W2C handover parameter or the second trigger condition based on at least the second value of the second W2C handover parameter. If no trigger conditions are met, flowchart 300 returns to monitoring in operation 322.

Flowchart 300 waits until a time period determined by handover timer value 144 before initiating the second W2C handover. If decision operation 326 determines that the handover timer has not lapsed, flowchart 300 returns to monitoring in operation 322. Otherwise, if a trigger condition has been met, and the handover timer has lapsed, operation 328 includes, based on at least detecting the first trigger condition or the second trigger condition, initiating, by UE 102, a W2C handover of the second live conversation. The handover occurs in operation 330, and the second live conversation terminates in operation 332. Flowchart 300 also describes the no-call W2C handover scenario, for example if operations 304, 316, 320, and 332 do not occur.

FIG. 4 illustrates a flowchart 400 of exemplary operations associated with examples of arrangement 100. In some examples, at least a portion of flowchart 400 may be performed using one or more computing devices 600 of FIG. 6. Flowchart 400 commences with operation 402, which includes determining, for a wireless network, at least one live conversation performance indicator. Operation 404 includes, based on the at least one live conversation performance indicator, determining at least one W2C handover parameter of a set of W2C handover parameters, the set of W2C handover parameters including a first W2C handover parameter indicating a first trigger condition and a second W2C handover parameter indicating a second trigger condition. Operation 406 includes transmitting, by the wireless network, to a user equipment (UE), the at least one W2C handover parameter.

FIG. 5 illustrates a flowchart 500 of exemplary operations associated with examples of arrangement 100. In some examples, at least a portion of flowchart 500 may be performed using one or more computing devices 600 of FIG. 6. Flowchart 500 commences with operation 502, which includes detecting, by a UE, a first trigger condition based on at least a first value of a first W2C handover parameter or a second trigger condition based on at least a first value of a second W2C handover parameter. Operation 504 includes, based on at least detecting the first trigger condition or the second trigger condition, initiating, by the UE, a W2C handover of a first live conversation.

Operation 506 includes receiving, by the UE, from a wireless network, a second value of the first W2C handover parameter and/or a second value of the second W2C handover parameter. Operation 508 includes detecting, by the UE, the first trigger condition based on at least the second value of the first W2C handover parameter or the second trigger condition based on at least the second value of the second W2C handover parameter. Operation 510 includes, based on at least detecting the first trigger condition or the second trigger condition, initiating, by the UE, a W2C handover of a second live conversation.

Figure 6:
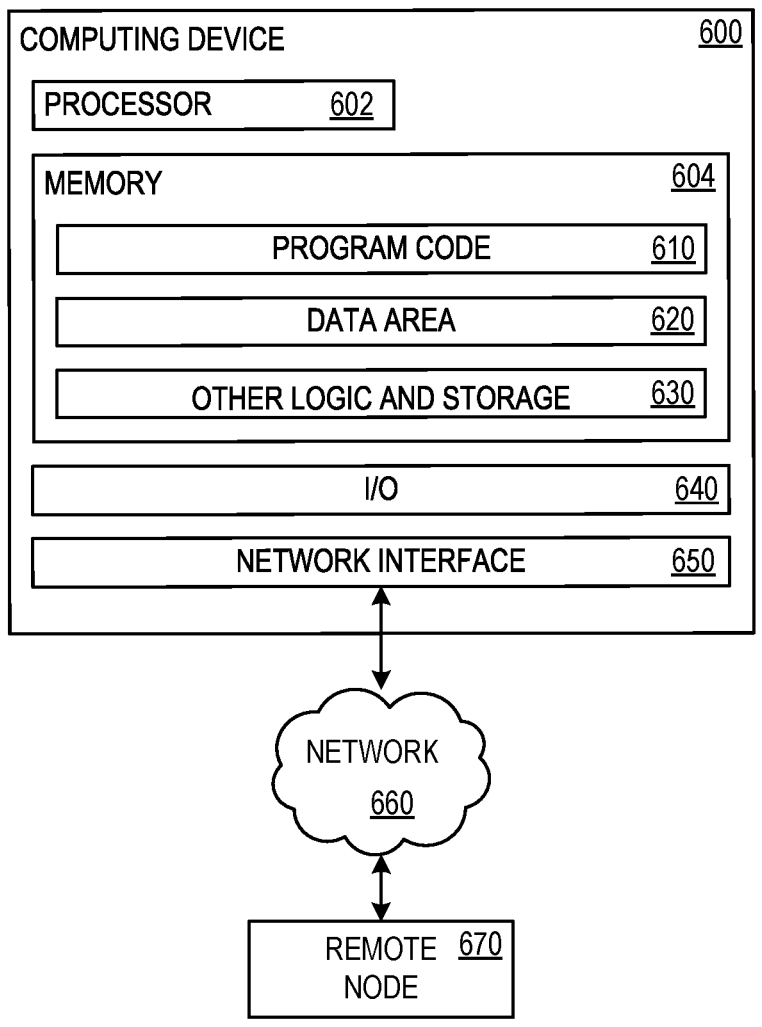
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/ or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600. For example, a remote node 670 may represent another of the above-noted nodes within arrangement 100.

ADDITIONAL EXAMPLES

An example method of wireless communication comprises: determining, for a wireless network, at least one live conversation performance indicator; based on the at least one live conversation performance indicator, determining at least one W2C handover parameter of a set of W2C handover parameters, the set of W2C handover parameters including a first W2C handover parameter indicating a first trigger condition and a second W2C handover parameter indicating a second trigger condition; and transmitting, by the wireless network, to a UE, the at least one W2C handover parameter.

Another example method of wireless communication comprises: detecting, by a UE, a first trigger condition based on at least a first value of a first W2C handover parameter or a second trigger condition based on at least a first value of a second W2C handover parameter; based on at least detecting the first trigger condition or the second trigger condition, initiating, by the UE, a W2C handover of a first live conversation; receiving, by the UE, from a wireless network, a second value of the first W2C handover parameter and/or a second value of the second W2C handover parameter; detecting, by the UE, the first trigger condition based on at least the second value of the first W2C handover parameter or the second trigger condition based on at least the second value of the second W2C handover parameter; and based on at least detecting the first trigger condition or the second trigger condition, initiating, by the UE, a W2C handover of a second live conversation.

An example system for wireless communication comprises: a processor; and a computer-readable medium storing instructions that are operative upon execution by the processor to: determine, for a wireless network, at least one live conversation performance indicator; based on the at least one live conversation performance indicator, determine at least one W2C handover parameter of a set of W2C handover parameters, the set of W2C handover parameters including a first W2C handover parameter indicating a first trigger condition and a second W2C handover parameter indicating a second trigger condition; and transmit, by the wireless network, to a UE, the at least one W2C handover parameter.

Another example system for wireless communication comprises: a processor; and a computer-readable medium storing instructions that are operative upon execution by the processor to: detect, by a UE, a first trigger condition based on at least a first value of a first W2C handover parameter or a second trigger condition based on at least a first value of a second W2C handover parameter; based on at least detecting the first trigger condition or the second trigger condition, initiate, by the UE, a W2C handover of a first live conversation; receive, by the UE, from a wireless network, a second value of the first W2C handover parameter and/or a second value of the second W2C handover parameter; detect, by the UE, the first trigger condition based on at least the second value of the first W2C handover parameter or the second trigger condition based on at least the second value of the second W2C handover parameter; and based on at least detecting the first trigger condition or the second trigger condition, initiate, by the UE, a W2C handover of a second live conversation.

One or more example computer storage devices has computer-executable instructions stored thereon, which, upon execution by a computer, cause the computer to perform operations comprising: determining, for a wireless network, at least one live conversation performance indicator; based on the at least one live conversation performance indicator, determining at least one W2C handover parameter of a set of W2C handover parameters, the set of W2C handover parameters including a first W2C handover parameter indicating a first trigger condition and a second W2C handover parameter indicating a second trigger condition;

and transmitting, by the wireless network, to a UE, the at least one W2C handover parameter.

One or more example computer storage devices has computer-executable instructions stored thereon, which, upon execution by a computer, cause the computer to perform operations comprising: detecting, by a UE, a first trigger condition based on at least a first value of a first W2C handover parameter or a second trigger condition based on at least a first value of a second W2C handover parameter; based on at least detecting the first trigger condition or the second trigger condition, initiating, by the UE, a W2C handover of a first live conversation; receiving, by the UE, from a wireless network, a second value of the first W2C handover parameter and/or a second value of the second W2C handover parameter; detecting, by the UE, the first trigger condition based on at least the second value of the first W2C handover parameter or the second trigger condition based on at least the second value of the second W2C handover parameter; and based on at least detecting the first trigger condition or the second trigger condition, initiating, by the UE, a W2C handover of a second live conversation.

Alternatively, or in addition to the other examples described herein, examples include any combination of the following:

transmitting the at least one W2C handover parameter comprises transmitting the at least one W2C handover parameter without transmitting a UE software update;

transmitting multiple values of the at least one W2C handover parameter in multiple events, between UE software updates;

the live conversation session comprises a voice call or a video call;

determining at least one live conversation performance indicator comprises: determining at least one performance indicator for a live conversation session over cellular and determining at least one live conversation performance indicator for a live conversation session over WiFi;

determining at least one W2C handover parameter comprises: determining the first W2C handover parameter and determining the second W2C handover parameter;

transmitting the at least one W2C handover parameter comprises: transmitting the first W2C handover parameter and transmitting the second W2C handover parameter;

the at least one live conversation performance indicator is selected from the list consisting of: a cellular call drop rate, a WiFi call drop rate, and a handover failure rate;

the set of W2C handover parameters includes at least an RSRP threshold and/or an RSS) threshold;

the set of W2C handover parameters is specific to at least one factor selected from the list consisting of: a cellular technology generation, a model of the UE, and whether a dedicated bearer (or QoS flow) is already in use for a live conversation session;

detecting, by the UE, the first trigger condition;

detecting, by the UE, the second trigger condition;

based on at least detecting the first trigger condition or the second trigger condition, initiating, by the UE, the handover of the live conversation;

the voice call initially comprises a VoWiFi call;

the video call initially comprises a video call over WiFi;

determining at least one W2C handover parameter comprises determining, with an ML component, the at least one W2C handover parameter;

the set of W2C handover parameters includes at least a threshold for a cellular signal;

the set of W2C handover parameters includes at least a
threshold for a WiFi signal;
the set of W2C handover parameters is specific to 5G
cellular technology;
the set of W2C handover parameters is specific to 4G
cellular technology;
the set of W2C handover parameters includes a handover
timer value;
attempting, by the UE, to initiate the first live conversa-
tion session over the wireless network using cellular;
based on at least failing to initiate the first live conver-
sation session over the wireless network using cellular,
initiating, by the UE, the first live conversation session
over the wireless network using WiFi;
attempting, by the UE, to initiate the second live conver-
sation session over the wireless network using cellular;
based on at least failing to initiate the second live con-
versation session over the wireless network using cel-
lular, initiating, by the UE, the second live conversation
session over the wireless network using WiFi;
the first live conversation session comprises a voice call
or a video call;
the second live conversation session comprises a voice
call or a video call;
the first W2C handover parameter comprises a threshold
for a cellular signal;
the second W2C handover parameter comprises a thresh-
old for a cellular signal;
the first W2C handover parameter comprises a threshold
for a WiFi signal;
the second W2C handover parameter comprises a thresh-
old for a WiFi signal;
receiving, by the UE, from the wireless network, a han-
dover timer value;
waiting until a time period determined by the handover
timer value before initiating the first W2C handover;
and
waiting until a time period determined by the handover
timer value before initiating the second W2C handover.
The order of execution or performance of the operations
in examples of the disclosure illustrated and described
herein is not essential, unless otherwise specified. That is,
the operations may be performed in any order, unless
otherwise specified, and examples of the disclosure may
include additional or fewer operations than those disclosed
herein. For example, it is contemplated that executing or
performing a particular operation before, contemporane-
ously with, or after another operation is within the scope of
aspects of the disclosure. It will be understood that the
benefits and advantages described above may relate to one
embodiment or may relate to several embodiments. When
introducing elements of aspects of the disclosure or the
examples thereof, the articles "a," "an," "the," and "said" are
intended to mean that there are one or more of the elements.
The terms "comprising," "including," and "having" are
intended to be inclusive and mean that there may be addi-
tional elements other than the listed elements. The term
"exemplary" is intended to mean "an example of."
Having described aspects of the disclosure in detail, it will
be apparent that modifications and variations are possible
without departing from the scope of aspects of the disclosure
as defined in the appended claims. As various changes may
be made in the above constructions, products, and methods
without departing from the scope of aspects of the disclo-
sure, it is intended that all matter contained in the above
description and shown in the accompanying drawings shall
be interpreted as illustrative and not in a limiting sense.

What is claimed is:
1. A method of wireless communication, the method
comprising:
determining, by a wireless network, a cellular call drop
rate for a cellular radio access network (RAN) and a
WiFi call drop rate for a WiFi access network operated
independently from the cellular RAN, wherein a user
equipment (UE) is communicatively coupled to both
the cellular RAN and the WiFi access network;
selecting, by the wireless network based on the cellular
call drop rate and the WiFi call drop rate, between an
aggressive W2C handover trigger, a hybrid handover
trigger, and a conservative W2C handover trigger for
initiating a W2C handover of the UE, the aggressive
W2C handover trigger initiating the W2C handover of
the UE when a cellular signal measurement exceeds a
first cellular threshold independent of a WiFi signal
measurement, the conservative W2C handover trigger
initiating the W2C handover of the UE when both the
cellular signal measurement exceeds a second cellular
threshold, that is lower than the first cellular threshold,
and the WiFi signal measurement fails to exceed a WiFi
threshold, the hybrid handover trigger initiating the
W2C handover of the UE when either (i) the cellular
signal measurement exceeds the first cellular threshold
independent of the WiFi signal measurement or (ii)
both the cellular signal measurement exceeds the sec-
ond cellular threshold and the WiFi signal measurement
fails to exceed the WiFi threshold; and
transmitting, by the wireless network, at least one W2C
handover parameter to the UE, the at least one W2C
parameter prompting the UE to initiate a handover of a
dedicated bearer or quality of service (QoS) flow of the
UE from the WiFi access network to the cellular RAN
based on the selected W2C handover trigger.
2. The method of claim 1, wherein the at least one W2C
handover parameter is specific to at least a cellular technol-
ogy generation or a model of the UE.
3. The method of claim 1, wherein the first cellular
threshold and the second cellular threshold indicate different
reference signal receive power (RSRP) thresholds.
4. The method of claim 1, wherein the first cellular
threshold and the second cellular threshold indicate different
received signal strength indication (RSSI) thresholds.
5. The method of claim 1, wherein the first cellular
threshold and the second cellular threshold are in-call
thresholds.
6. The method of claim 1, wherein the WiFi threshold is
an in-call threshold.
7. A system for wireless communication, the system
comprising:
a processor, and
a computer-readable medium storing instructions that are
operative upon execution by the processor to:
determine, by a wireless network, a cellular call drop rate
for a cellular radio access network (RAN) and a WiFi
call drop rate for a WiFi access network operated
independently from the cellular RAN, wherein a user
equipment (UE) is communicatively coupled to both
the cellular RAN and the WiFi access network;
select, by the wireless network based on the cellular call
drop rate and the WiFi call drop rate, between an
aggressive W2C handover trigger, a hybrid handover
trigger, and a conservative W2C handover trigger for
initiating a W2C handover of the UE, the aggressive
W2C handover trigger initiating the W2C handover of
the UE when a cellular signal measurement exceeds a first cellular threshold independent of a WiFi signal measurement, the conservative W2C handover trigger initiating the W2C handover of the UE when both the cellular signal measurement exceeds a second cellular threshold, that is lower than the first cellular threshold, and the WiFi signal measurement fails to exceed a WiFi threshold, the hybrid handover trigger initiating the W2C handover of the UE when either (i) the cellular signal measurement exceeds the first cellular threshold independent of the WiFi signal measurement or (ii) both the cellular signal measurement exceeds the second cellular threshold and the WiFi signal measurement fails to exceed the WiFi threshold; and transmit, by the wireless network, at least one W2C handover parameter to the UE, the at least one W2C parameter prompting the UE to initiate a handover of a dedicated bearer or quality of service (QoS) flow of the UE from the WiFi access network to the cellular RAN based on the selected W2C handover trigger.

8. The system of claim 7, wherein the at least one W2C handover parameter is specific to at least a cellular technology generation or a model of the UE.

9. The system of claim 7, wherein the first cellular threshold and the second cellular threshold indicate different reference signal receive power (RSRP) thresholds.

10. The system of claim 7, wherein the first cellular threshold and the second cellular threshold indicate different received signal strength indication (RSSI) thresholds.

11. The system of claim 7, wherein the first cellular threshold and the second cellular threshold are in-call thresholds.

12. The system of claim 7, wherein the WiFi threshold is an in-call threshold.

13. One or more computer storage devices having computer-executable instructions stored thereon, which, upon execution by a computer, cause the computer to perform operations comprising:

determining, by a wireless network, a cellular call drop rate for a cellular radio access network (RAN) and a WiFi call drop rate for a WiFi access network operated independently from the cellular RAN, wherein a user equipment (UE) is communicatively coupled to both the cellular RAN and the WiFi access network;

selecting, by the wireless network based on the cellular call drop rate and the WiFi call drop rate, between an aggressive W2C handover trigger, a hybrid handover trigger, and a conservative W2C handover trigger for initiating a W2C handover of the UE, the aggressive W2C handover trigger initiating the W2C handover of the UE when a cellular signal measurement exceeds a first cellular threshold independent of a WiFi signal measurement, the conservative W2C handover trigger initiating the W2C handover of the UE when both the cellular signal measurement exceeds a second cellular threshold, that is lower than the first cellular threshold, and the WiFi signal measurement fails to exceed a WiFi threshold, the hybrid handover trigger initiating the W2C handover of the UE when either (i) the cellular signal measurement exceeds the first cellular threshold independent of the WiFi signal measurement or (ii) both the cellular signal measurement exceeds the second cellular threshold and the WiFi signal measurement fails to exceed the WiFi threshold; and transmitting, by the wireless network, at least one W2C handover parameter to the UE, the at least one W2C parameter prompting the UE to initiate a handover of a dedicated bearer or quality of service (QoS) flow of the UE from the WiFi access network to the cellular RAN based on the selected W2C handover trigger.

14. The one or more computer storage devices of claim 13, wherein the at least one W2C handover parameter is specific to at least a cellular technology generation or a model of the UE.

15. The one or more computer storage devices of claim 13, wherein the first cellular threshold and the second cellular threshold indicate different reference signal receive power (RSRP) thresholds.

16. The one or more computer storage devices of claim 13, wherein the first cellular threshold and the second cellular threshold indicate different received signal strength indication (RSSI) thresholds.

17. The one or more computer storage devices of claim 13, wherein the first cellular threshold and the second cellular threshold are in-call thresholds.

18. The one or more computer storage devices of claim 13, wherein the WiFi threshold is an in-call threshold.

\* \* \* \* \*